United States Patent
Ikezoe

(10) Patent No.: US 7,504,831 B2
(45) Date of Patent: Mar. 17, 2009

(54) CELL-VOLTAGE MEASURING STRUCTURE FOR FUEL CELL STACK AND RELATED METHOD

(75) Inventor: Keigo Ikezoe, Ayase (JP)

(73) Assignee: Nissan Motor Co., Ltd., Yokohama-shi (JP)

(*) Notice: Subject to any disclaimer, the term of this patent is extended or adjusted under 35 U.S.C. 154(b) by 254 days.

(21) Appl. No.: 11/083,317

(22) Filed: Mar. 18, 2005

(65) Prior Publication Data

US 2005/0214600 A1  Sep. 29, 2005

(30) Foreign Application Priority Data

Mar. 23, 2004  (JP) ............................. 2004-085233
Feb. 22, 2005  (JP) ............................. 2005-046003

(51) Int. Cl.
*G01N 27/416*  (2006.01)
*H01M 8/00*  (2006.01)

(52) U.S. Cl. ..................... 324/434; 324/426; 429/12; 320/101

(58) Field of Classification Search ................ 324/426, 324/430, 433, 434; 320/101, 162, 164; 429/12
See application file for complete search history.

(56) References Cited

U.S. PATENT DOCUMENTS 6,638,650 B1  10/2003  Bailey et al.

2002/0177019 A1 * 11/2002  Aoto et al. ..................... 429/22
2003/0048091 A1  3/2003  Sato et al.

FOREIGN PATENT DOCUMENTS

| EP | 1 246 282 A1 | 10/2002 |
|---|---|---|
| JP | 08-106914 A | 4/1996 |
| JP | 09-283166 A | 10/1997 |
| JP | 2002-358993 A | 12/2002 |
| JP | 2002358993 A * | 12/2002 |
| JP | 2003-086205 A | 3/2003 |

* cited by examiner

*Primary Examiner*—Akm E Ullah
*Assistant Examiner*—Ramy Ramadan
(74) *Attorney, Agent, or Firm*—Foley & Lardner LLP

(57) ABSTRACT

A cell-voltage measuring structure for a fuel cell stack, in which a plurality of unit cells, having conductive separators which includes anode-side separators and cathode-side separators to form pairs of unit separators with the anode-side separators and the cathode-side separators adjacent to each other, respectively, are stacked in a stack direction, is provided with a voltage-measuring unit having a conductive voltage-measuring terminal, a contact section, with which the conductive voltage-measuring terminal is to be held in contact, formed on an outer periphery of a first pair of unit separators, a non-contact section, with which the conductive voltage-measuring terminal is not to be held in contact, formed on an outer periphery of a second pair of unit separators adjacent to the first pair of unit separators. A length of the conductive voltage-measuring terminal is greater than a thickness of the first pair of unit separators, in the stack direction.

16 Claims, 9 Drawing Sheets

CELL-VOLTAGE MEASURING STRUCTURE FOR FUEL CELL STACK AND RELATED METHOD

BACKGROUND OF THE INVENTION

The present invention relates to a cell-voltage measuring structure for a fuel cell stack and its related method and, more particularly, to a cell-voltage measuring structure for a fuel cell stack provided with a plurality of stacks of unit cells including conductive separators and its related method. A fuel cell system, which serves as a device that directly converts chemical energy of fuel into electrical energy, includes a pair of electrodes, between which an electrolyte membrane is sandwiched, an anode electrode of which is supplied with fuel gas, containing hydrogen, while the other cathode electrode is supplied with oxidizer gas, containing oxygen, to cause electrochemical reaction, described below, to occur on surfaces of the pair of these electrodes on respective sides facing the electrolyte membrane for extracting electrical energy from the electrodes (see Japanese Patent Application Laid-Open Publication No. 8-106914).

Anode Reaction: $H_2 \rightarrow 2H^+ + 2e^-$ (1)

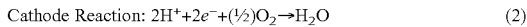

Cathode Reaction: $2H^+ + 2e^- + (½)O_2 \rightarrow H_2O$ (2)

It is known that fuel gas is supplied to the anode electrode by a method in which hydrogen is directly supplied from a hydrogen storage tank or a method in which hydrogen-containing fuel is reformed to supply hydrogen-containing gas. Examples of the hydrogen storage tank include a high-pressure gas tank, a liquid hydrogen tank and a hydrogen-absorbinig alloy tank. Examples of hydrogen-containing gas include natural gas, methanol and gasoline. On the other hands as for fuel gas supplied to the cathode electrode, air is commonly utilized.

With such a fuel cell system, the pair of electrodes are sandwiched between conductive separators to form a unit cell and a plurality of unit cells are stacked into a fuel cell stack that is normally used. Here, a need arises for monitoring (measuring) a cell voltage of each unit cell with a view to confirming whether normal electric power generation takes place and controlling the flow rates of reaction gases based on the cell voltages upon which in the presence of abnormal voltages, a fail-safe function is rendered operative in the system.

Japanese Patent Application Laid-Open Publication No. 9-283166 proposes a cell-voltage measuring structure wherein side faces of the separators of each unit cell are formed with two round holes, that is, an anode separator and a cathode separator of the unit cell are formed with one round hole one-by-one, to which monitor pin terminals are inserted for monitoring the cell voltage.

Japanese Patent Application Laid-Open Publication No. 2002-358993 proposes a structure wherein a metallic plate, formed in a C-shape with a spring property, is clamped onto concaved portions formed on separators to monitor a voltage of each unit cell.

Japanese Patent Application Laid-Open Publication No. 2003-86205 proposes a cell-voltage measuring structure wherein a resiliently deformable cell-voltage monitoring member is depressed against a dent formed in a unit cell to cause resilient deformation whereby a contact between the unit cell and the cell voltage monitoring member is prevented from loosening.

SUMMARY OF THE INVENTION

However, upon studies conducted by the present inventor, such related art structures suffer from adverse affects in which pitches among the unit cells widely vary as a result of variation in wall thickness precision of the separators, variation in collapsible margin of seal members and variation in collapsible margin of gas diffusion layers on the electrode surfaces with the resultant limitation in restricting positions of the respective unit cells in a stack direction. Additionally, it is needed to consider that the positions of the respective unit cells tend to shift due to deformations of the respective members caused by heat built up during electric power-generating operations.

Certainly, in order to address such issues, it becomes possible to adopt a structure wherein mounting voltage-measuring terminals to the unit cells one-by-one prevents the voltage-measuring terminals from disengaging from the unit cells even if the unit cells are deviated in the stack direction.

However, attempts to mount the voltage-measuring terminals to the unit cells one-by-one result in a huge number of man-hours on working process with the resultant increase in costs.

The present invention has been completed with the above study in mind conducted by the present inventor and has an object to provide a cell-voltage measuring structure for a fuel cell stack and its related method that enable voltage-measuring terminals to be easily mounted onto the fuel cell stack while absorbing variation in positions of unit cells in a stack direction.

To achieve the above object, in one aspect according to the present invention, there is provided a cell-voltage measuring structure for a fuel cell stack in which a plurality of unit cells, having conductive separators, are stacked in a stack direction, the conductive separators including anode-side separators and cathode-side separators to form pairs of unit separators with the anode-side separators and the cathode-side separators adjacent to each other, respectively, the structure comprising: a voltage-measuring unit having a conductive voltage-measuring terminal; a contact section, with which the conductive voltage-measuring terminal is to be held in contact, formed on an outer periphery of a first pair of unit separators; and a non-contact section, with which the conductive voltage-measuring terminal is not to be held in contact, formed on an outer periphery of a second pair of unit separators adjacent to the first pair of unit separators, a length of the conductive voltage-measuring terminal in a stack direction being greater than a thickness of the first pair of unit separators in the stack direction.

In other words, in another aspect according to the present invention, there is provided a cell-voltage measuring structure for a fuel cell stack in which a plurality of unit cells, having conductive separators, are stacked in a stack direction, the conductive separators including anode-side separators and cathode-side separators to form pairs of unit separators with the anode-side separators and the cathode-side separators adjacent to each other, the structure comprising: a voltage-measuring unit having a conductive voltage-measuring terminal; first means for contacting the conductive voltage-measuring terminal, the first means being formed on an outer periphery of a first pair of unit separators; and second means for avoiding contact with the conductive voltage-measuring terminal, the second means being formed on an outer periphery of a second pair of unit separators adjacent to the first pair of unit separators, a length of the conductive voltage-measuring terminal in a stack direction being greater than a thickness of the first pair of unit separators in the stack direction.

In the meanwhile, in another aspect according to the present invention, there is provided a cell-voltage measuring method of measuring a cell-voltage of a fuel cell stack in which a plurality of unit cells, having conductive separators, are stacked in a stack direction, the conductive separators including anode-side separators and cathode-side separators to form pairs of unit separators with the anode-side separators and the cathode-side separators adjacent to each other, comprising: providing a voltage-measuring unit having a first conductive voltage-measuring terminal and a second conductive voltage-measuring terminal; providing a fuel cell stack including a first pair of unit separators and a second pair of unit separators, a first contact section being formed on an outer periphery of the first pair of unit separators to be held in contact with the first conductive voltage-measuring terminal, a first non-contact section being formed on the outer periphery of the first pair of unit separators not to be held in contact with the second conductive voltage-measuring terminal, a second contact section being formed on an outer periphery of the second pair of unit separators to be held in contact with the second conductive voltage-measuring terminal, a second non-contact section being formed on the outer periphery of the second pair of unit separators not to be held in contact with the first conductive voltage-measuring terminal, a length of the first conductive voltage-measuring terminal in a stack direction being greater than a thickness of the first pair of unit separators in the stack direction and a length of the second conductive voltage-measuring terminal in the stack direction being greater than a thickness of the second pair of unit separators in the stack direction; and measuring a cell-voltage of a fuel cell stack while causing the first contact section to contact the first conductive voltage-measuring terminal and the second contact section to contact the second conductive voltage-measuring terminal.

Other and further features, advantages, and benefits of the present invention will become more apparent from the following description taken in conjunction with the following drawings.

DETAILED DESCRIPTION OF THE PREFERRED EMBODIMENTS

Hereinafter, a cell-voltage measuring structure for a fuel cell stack and its related method of each embodiment according to the present invention are described below with reference to FIGS. 1 to 9B.

First Embodiment

First, a cell-voltage measuring structure for a fuel cell stack and its related method of a first embodiment according to the present invention is described in detail with reference to FIGS. 1 to 4.

Figure 1:
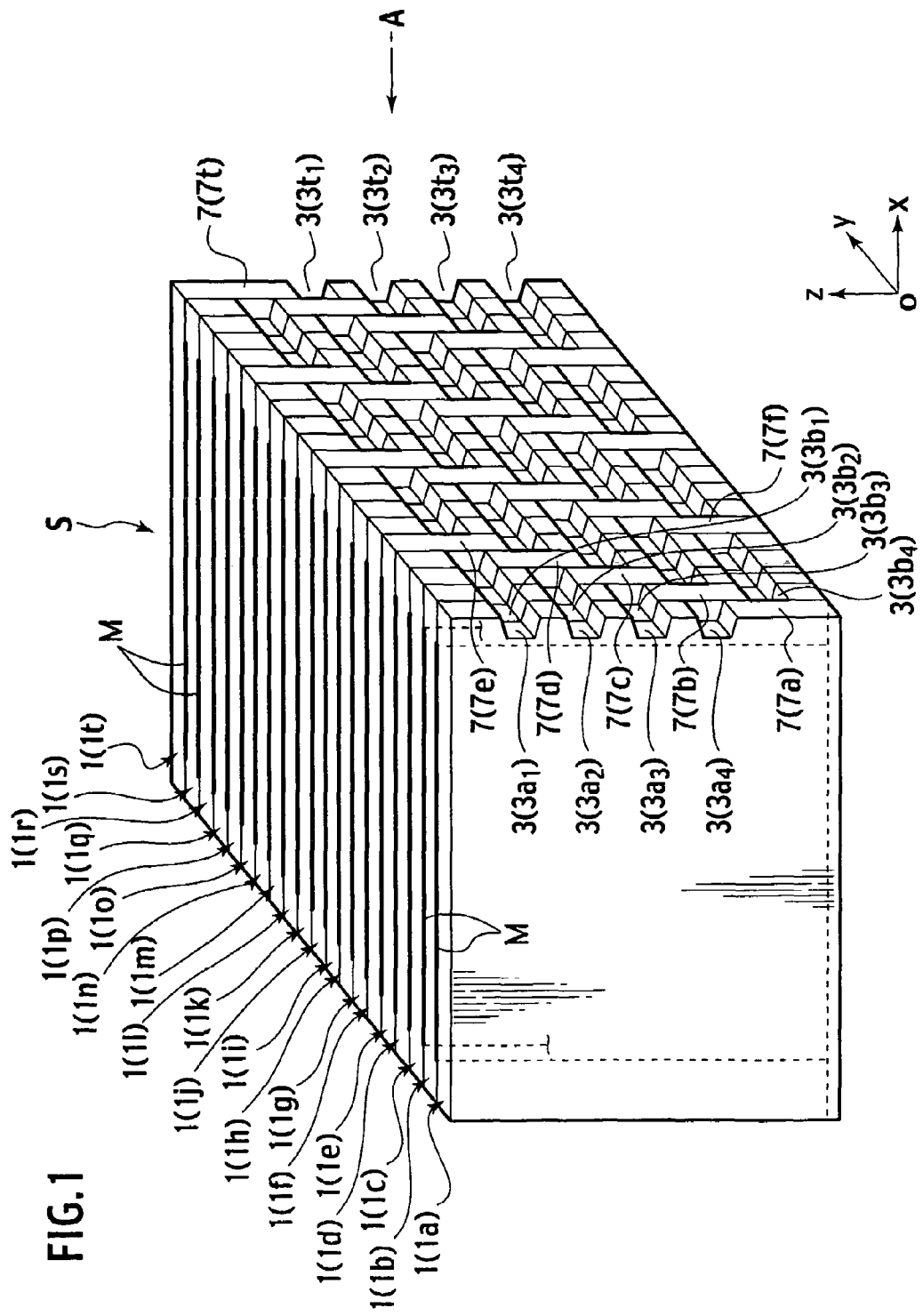
FIG. 1 is a perspective view illustrating a fuel cell stack to which a cell-voltage measuring structure of a first embodiment according to the present invention is applied.
Figure 2:
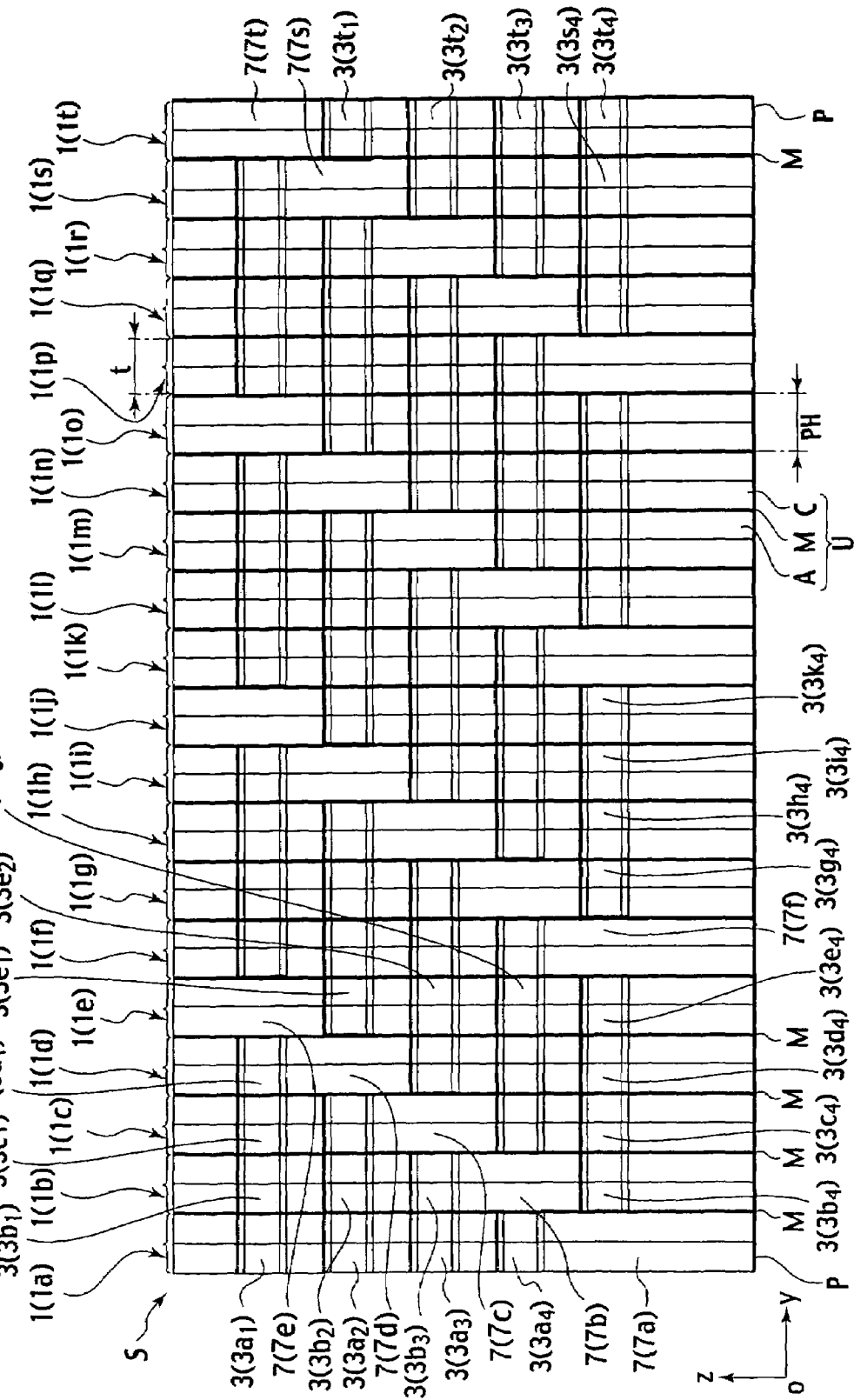
FIG. 2 is a front view of the fuel cell stack as viewed in a direction A in FIG. 1, that is, as viewed in a plane in which cutouts are formed on the fuel cell stack in the presently filed embodiment.
Figure 3:
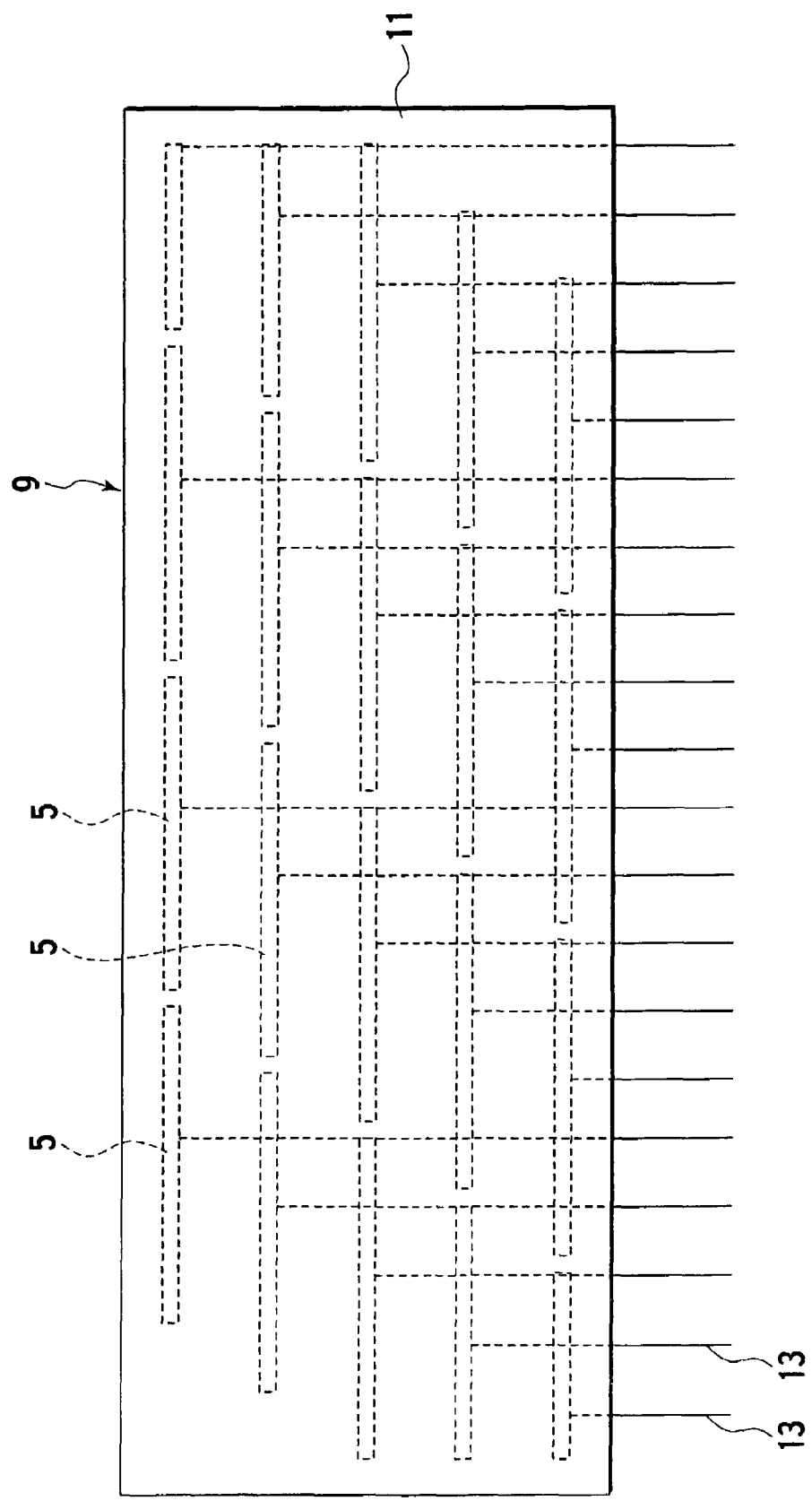
FIG. 3 is a plan view of the cell-voltage measuring unit in the presently filed embodiment.
Figure 4:
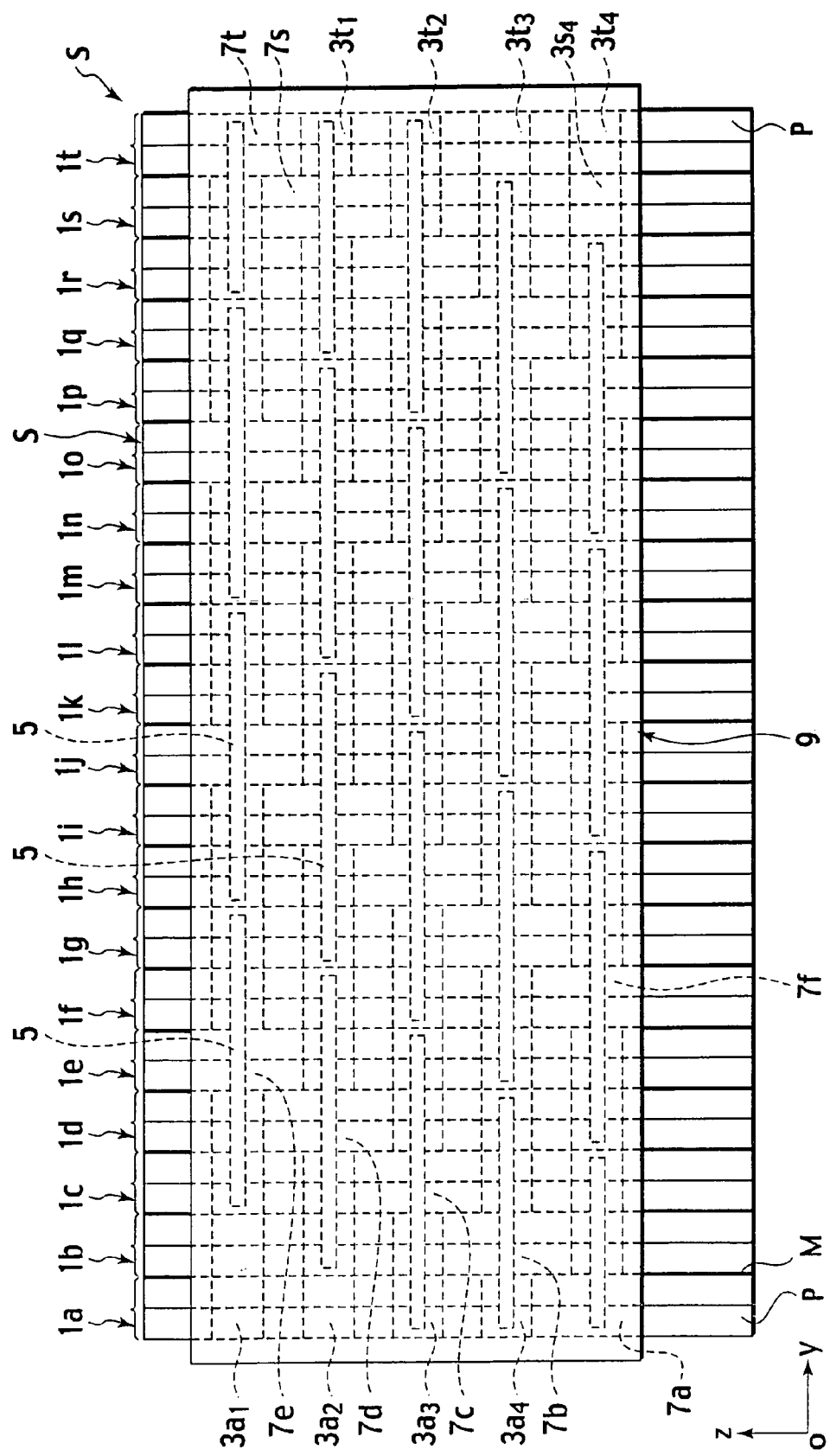
FIG. 4 is a front view illustrating the fuel cell stack in the presently filed embodiment under a status where a voltage measuring unit, show in FIG. 3, is overlapped on the surface, formed with the cutouts, of the fuel cell stack shown in FIG. 2.

FIG. 1 is a perspective view illustrating the fuel cell stack to which the cell-voltage measuring structure of the presently filed embodiment is applied; FIG. 2 is a front view of the fuel cell stack as viewed in a direction as shown by an arrow A in FIG. 1, that is, the fuel cell stack as viewed from a plane in which cutouts are present in the presently filed embodiment; FIG. 3 is a plan view illustrating the cell voltage measuring unit of the presently filed embodiment; and FIG. 4 is a front view of the fuel cell stack illustrating a status in which the cell-voltage measuring unit, shown in FIG. 3, is overlapped on a surface, formed with the cutouts, of the fuel cell stack shown in FIG. 2. Incidentally, throughout the drawing figures, an x-axis, a y-axis and z-axis form a rectangular coordinate system.

As shown in FIGS. 1 and 2, the fuel cell stack S has a structure in which rectangular plural unit cells U, each including a conductive anode-side separator (anode separator) A and a conductive cathode-side separator (cathode separator C), a membrane electrode assembly (MEA) M sandwiched between the anode separator A and the cathode separator C and composed of a pair of electrodes (an anode electrode and a cathode electrode: not shown, respectively), an electrolyte membrane (not shown), whose both surfaces are formed with the pair of electrodes, and necessary sealing sections (not shown), are sequentially stacked. The anode separator A is formed with channels to pass fuel gas for supply to the anode electrode and the cathode separator C is formed with channels to pass oxidizer gas for supply to the cathode electrode. Here, for the separators, pairs of unit separators 1, that is, the pairs of unit separators $1a, 1a, 1b, 1c \ldots 1t$ are defined as structural elements in each of which the anode separator A of one unit cell and the cathode separator C of the adjacent unit cell thereto are adhered to each other. In addition, for the pair of unit separators $1a$ at one end of the fuel cell stack S, an electric current extracting plate P is adhered to the anode separator A in place of the cathode separator C, and in the meanwhile, for the pair of unit separators $1t$ at the other end of the fuel cell stack S, an electric current extracting plate P is adhered to the cathode separator C in place of the anode separator A. For the sake of convenience, in FIG. 2, the electric current extracting plates P, the anode separators A, the cathode separators C and the membrane electrode assemblies M are simply shown as independent structural elements.

Incidentally, other component elements of the fuel cell stack S include, in addition to the electric current extracting plates P, end plates placed on both ends of the fuel cell stack to apply pressure to respective layers, tie rods through which end plates on both ends are mutually tightened and manifolds through which fuel gas and oxidizer gas are supplied, but these component parts are omitted in the drawings.

On one side face of the fuel cell stack S, various pairs of unit separators $1a, 1b, 1c \ldots 1t$ have outer circumferential peripheries of which one end faces are formed with four concave portions 3, respectively, in a way wherein the pair of unit separators $1a$, located on the most front side in FIG. 1, has four cutouts 3 in the form of concave portions as indicated by references $3a_1 \ldots 3a_4$ and the adjacent pair of unit separators $1b$ has four cutouts 3 in the form of concave portions as indicated by references $3b_1 \ldots 3b_4$. Here, the pairs of unit separators $1a, 1a, 1b, 1c \ldots 1t$ include the anode separator A and the cathode separator C, respectively, as component elements, as viewed in FIG. 2. That is, the cutouts $3a_1 \ldots 3a_4$ of the pair of unit separators $1a$ are formed on the outer circumferential peripheries thereof and this principle applies to the following pairs of unit separators $1b, 1c \ldots 1t$. Incidentally, respective membrane electrode assemblies M between the anode separators A and the cathode separators C recede from the outer circumferential peripheries of the pairs of unit separators $1a, 1a, 1b, 1c \ldots 1t$ to avoid interference to voltage-measuring terminals 5, which is described below.

More particularly, the cutouts $3a_1, 3a_2, 3a_3, 3a_4$ are formed on the pair of unit separators $1a$, that is, the anode separator A and the electric current extracting plate P adjacent thereto on the left side thereof at four positions in an order from an upper end vicinity typically shown in FIG. 2 while no cutouts 3 are formed in a lower end vicinity to provide a flat section that serves as a voltage-measuring terminal contact section $7a$ with which a voltage-measuring terminal 5, which is described below, is brought into contact.

Next, a voltage-measuring terminal contact section $7b$, with which another voltage-measuring terminal 5, described later, is brought into contact, is formed on the pair of unit separators $1b$ adjacent to the pair of unit separators $1a$, that is, formed on the anode separator A and the cathode separator C, adjacent thereto on the right side thereof, of the pair of unit separators $1b$, in a position adjacent to the cutout $3a_4$ formed in the lowest area (fourth area from the above area) of the pair of unit separators $1a$, that is, in a position overlapping the cutout $3a_4$ in the stack direction (i.e., in a direction along the y-axis). Also, an upper side area of the voltage-measuring terminal contact section $7b$ is formed with cutouts $3b_1, 3b_2, 3b_3$ in a sequential order from an upper vicinity while a cutout $3b_4$ is formed in an area below the voltage-measuring terminal contact section $7b$, that is, in a position overlapping the voltage-measuring terminal contact section $7a$ of the pair of unit separators $1a$ in the stack direction.

Similarly, a voltage-measuring terminal contact section $7c$, with which another voltage-measuring terminal 5 is brought into contact, is formed on the pair of unit separators $1c$ adjacent to the pair of unit separators $1b$, that is, formed on the anode separator A and the cathode separator C, adjacent thereto on the right side thereof, of the pair of unit separators $1c$ in a position overlapping the cutouts $3a_3, 3b_3$, formed on the third positions from the above, of the pairs of unit separators $1a, 1b$ in the stack direction, respectively, and also an upper side area of the voltage-measuring terminal contact section $7c$ is formed with cutouts $3c_1, 3c_2$ in a sequential order from an upper vicinity while cutouts $3c_3, 3c_4$ are formed in an area below the voltage-measuring terminal contact section $7c$ in a sequential order, such that cutouts $3c_3$ is in a position overlapping the voltage-measuring terminal contact section $7b$ of the pair of unit separators $1b$ in the stack direction. Further, voltage-measuring terminal contact section $7d$, with which another voltage-measuring terminal 5 is brought into contact, is formed on the pair of unit separators $1d$ adjacent to the pair of unit separators $1c$, that is, formed on the anode separator A and the cathode separator C, adjacent thereto on the right side thereof, of the pair of unit separators $1d$ in a position overlapping the cutouts $3a_2, 3b_2, 3c_2$, formed on the second positions from the above, of the pairs of unit separators $1a, 1b, 1c$ in the stack direction, respectively, and also an upper side area of the voltage-measuring terminal contact section $7d$ is formed with cutout $3d_1$ at an upper vicinity while cutouts $3d_2, 3d_3, 3d_4$ are formed in an area below the voltage-measuring terminal contact section $7d$ in a sequential order, such that cutouts $3d_1$ is in a position overlapping the voltage-measuring terminal contact section $7c$ of the pair of unit separators $1c$ in the stack direction. Furthermore, a voltage-measuring terminal contact section $7e$, with which another voltage-measuring terminal 5 is brought into contact, is formed on the pair of unit separators $1e$ adjacent to the pair of unit separators $1d$, that is, formed on the anode separator A and the cathode separator C, adjacent thereto on the right side thereof, of the pair of unit separators $1e$ in a position overlapping the cutouts $3a_1, 3b_1, 3c_1, 3d_1$, formed on the first positions from the above, of the pair of unit separators $1a, 1b, 1c, 1d$, respectively, in the stack direction, and also a lower side area of the voltage-measuring terminal contact section $7e$ is formed with cutouts $3e_1, 3e_2, 3e_3, 3e_4$ in a sequential order, such that cutouts $3e_1$ is in a position overlapping the voltage-measuring terminal contact section $7d$ of the pair of unit separators $1d$ in the stack direction. Resultantly, the cutouts $3a_1, 3b_1, 3c_1, 3d_1$ and the voltage-measuring terminal contact section $7e$, the cutouts $3a_2, 3b_2, 3c_2, 3d_2$ and the voltage-measuring terminal contact section $7d$, the cutouts $3a_3, 3b_3, 3c_3, 3d_3$ and the voltage-measuring terminal contact section $7c$, the cutouts $3a_4, 3b_4, 3c_4, 3d_4$ and the voltage-measuring terminal contact section $7b$, and the cutouts $3a_5, 3b_5, 3c_5, 3d_5$ and the voltage-measuring terminal contact section $7a$ are aligned in the stack direction, respectively.

Thus, upon taking five pairs of unit separators 1, including the pairs of unit separators $1a \ldots 1e$, as one set, the voltage-measuring terminal contact sections 7 $(7a \ldots 7e)$ are sequentially shifted in position in such a way where a first pair of unit separators of the next one set, that is, the pair of unit separators $1f$ adjacent to the pair of unit separators $1e$, is so positioned to allow a voltage-measuring terminal contact section $7f$ to be positioned in a lower end vicinity like that of the pair of unit separators $1a$ and for the following pairs of unit separators 1, the positions of the voltage-measuring terminal contact sections 7 are sequentially dislocated. That is, such a structure is the same for every five pairs of unit separators 1 in each one set to resultantly form the fuel stack S. Incidentally, the residual portion other than the cutouts 3 on the face of the fuel cell stack S is the flat surface as same as the voltage-measuring terminal contact sections 7. Also, the width (length in a direction along the z-axis) of each cutout 3 is set to be greater than the width (length in the direction along the z-axis) of its corresponding voltage-measuring terminal 5, described later. Further, the adjacent voltage-measuring terminal contact sections 7 partly face to each other while intervening the membrane electrode assembly M therebetween.

Of course, the adjacent voltage-measuring terminal contact sections 7 may be disposed in a checkerwise manner not to be partly overlapped to each other.

By so doing, the fuel cell stack S is structured as shown in FIG. 1 and the fuel cell stack S provides a status as shown in FIG. 2 as viewed from a plane on which the cutouts 3 are present.

Here, as shown in FIG. 2, for example, the voltage-measuring terminal contact section 7f, wherein no cutout 3 is formed, of the pair of unit separators 1f, is located in a position with both sides of which the four pairs of unit separators 1b . . . 1e and the four pairs of unit separators 1g . . . 1j have the cutouts $3b_4$ . . . $3e_4$ and $3g_4$ . . . $3j_4$ aligned in the stack direction, respectively. Therefore, as far as a voltage-measuring terminal 5, whose length is equal to a total thickness of five pairs of unit separators 1 including the pair of unit separators 1f and each four pairs of unit separators on both sides thereof, is brought into contact with the voltage-measuring terminal contact section 7f of the pair of unit separators 1f, the resulting contact status can be enhanced for enabling the measurement of the cell voltage even if a central area of the voltage-measuring terminal 5 is deviated from a central area of the voltage-measuring terminal contact section 7f by a value of 2.5 pieces of the pairs of unit separators in the stack direction.

In such a case, although a change in position of the cutouts 3 seems to result in an increase in specifications with the resultant increase in costs, a mold processing method is typically adopted such that a removable mold component is set to a position where cutouts of a mold type are located whereupon a position of the mold component in an upper mold is altered every for several sheets for thereby easily fabricating separators of several kinds different in position of the cutouts at low costs.

In the meanwhile, as shown in the plan view of FIG. 3, a voltage-measuring unit 9, equipped with the voltage-measuring terminals 5, takes the form of a structure wherein the voltage-measuring terminals 5, each typically made of conductive material such as metal, are fixedly located on a nonconductive plate 11 by a technique, such as adhesive, and wirings 13 are connected to the voltage-measuring terminals 5, respectively, to deliver respective voltages to relay terminals that are not shown.

FIG. 4 shows a status in which the voltage-measuring unit 9, shown in FIG. 3, is overlapped onto a side face of the fuel cell stack S on the side thereof formed with the cutouts 3 shown in FIG. 2. Incidentally, the length of each voltage-measuring terminal 5 are set to be larger than the thickness t of each pair of unit separators 1, in the stack direction, typically as described above.

Under such a condition, the voltage-measuring terminal contact sections 7, with which the associated voltage-measuring terminals 5 for the pairs of unit separators 1 are held in contact, are present individually to the voltage-measuring terminal contact sections 7 of the other pairs of unit separators 1 adjacent thereto. Thus, even if the voltage-measuring terminal 5 has a length greater than the thickness t in the stack direction (see FIG. 2) of one pair of unit separators 1, the presence of the cutouts 3 enables the contact between the voltage-measuring terminal 5 and the pair of unit separators 1 to be avoided and even if the respective pair of unit separators are dislocated in the stack direction due to variation in thickness precision of the pair of unit separators or the like, the contact between the voltage-measuring terminal 5 and the associated pair of unit separators 1 is reliably enhanced, enabling the measurement of cell voltages, that is, respective voltages of the unit cells U.

Further, since the voltage-measuring unit 9, integrally equipped with plural voltage-measuring terminals 5, is sufficed to be mounted to the fuel cell stack S, no need arises for the voltage-measuring terminals to be mounted on the respective unit cells and, accordingly, a working process can be simplified with the resultant achievement of drop in costs.

Furthermore, the voltage-measuring terminals 5 are sufficed to be merely pressed against the associated separators of the fuel cell stack S with no need for the separators to be formed with bores for mounting the voltage-measuring terminals and, accordingly, the separators can be prevented from damage due to vibrations during operations of the fuel cell when measuring the cell voltages.

Incidentally, with the presently filed embodiment, although the positions of the cutouts 3 are involved in five kinds and the cutouts 3 tolerate the deviation of the pair of unit separators 1 in the stack direction by a value of ±2.5 times the thickness of the pair of unit separators 1, it is, of course, possible to increase or decrease the number of positions of the cutouts 3 to be formed on each pair of unit separators 1 depending on the deviated amount of the pair of unit separators 1 deviated in the stack direction thereof, that is, substantially depend on the deviated amount of the unit cells U that deviated in the stack direction thereof.

Second Embodiment

Next, a cell-voltage measuring structure for a fuel cell stack and its related method of a second embodiment according to the present invention is described below in detail with reference to FIGS. 5 to 6B.

Figure 5:
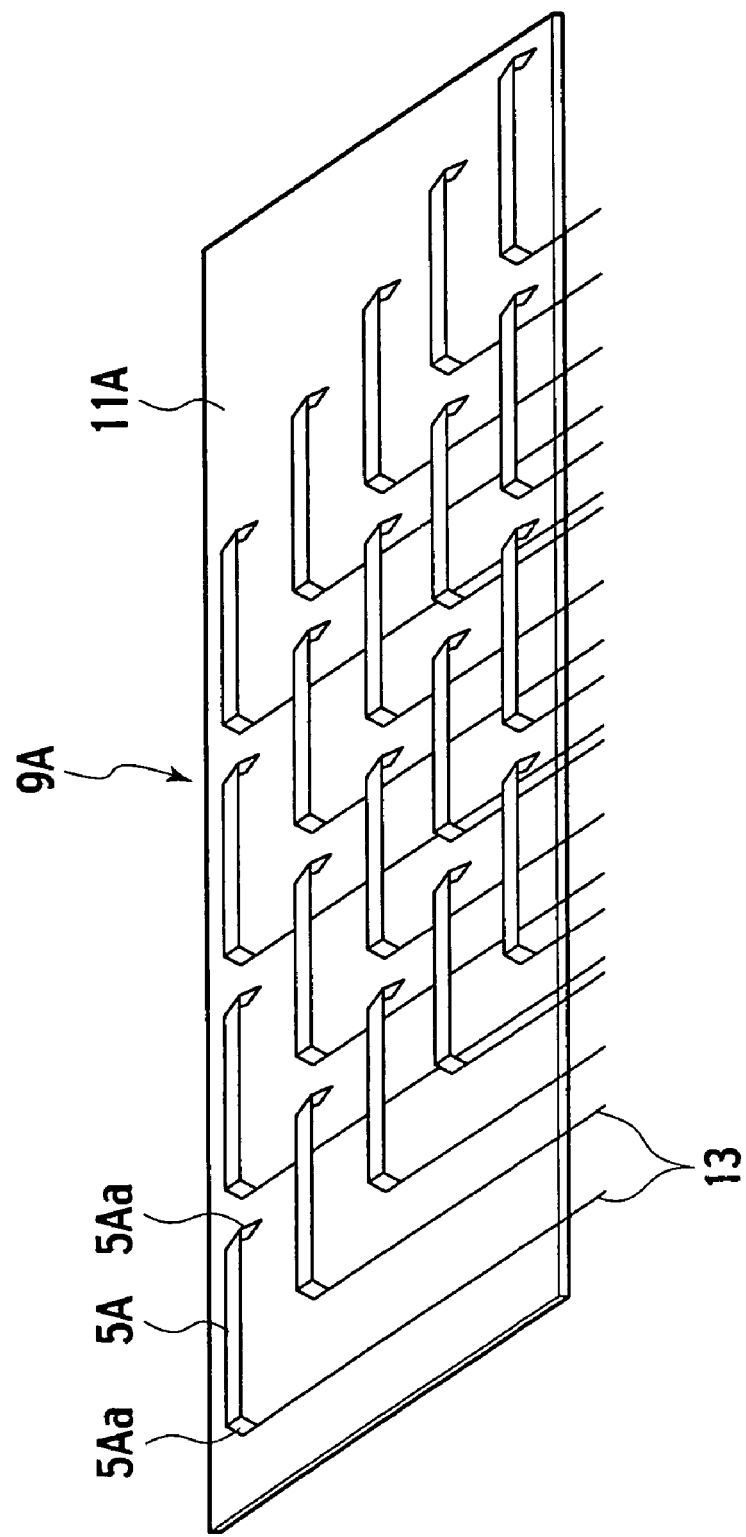
FIG. 5 is a perspective view of a cell-voltage measuring unit in a second embodiment according to the present invention.
Figure 6A:
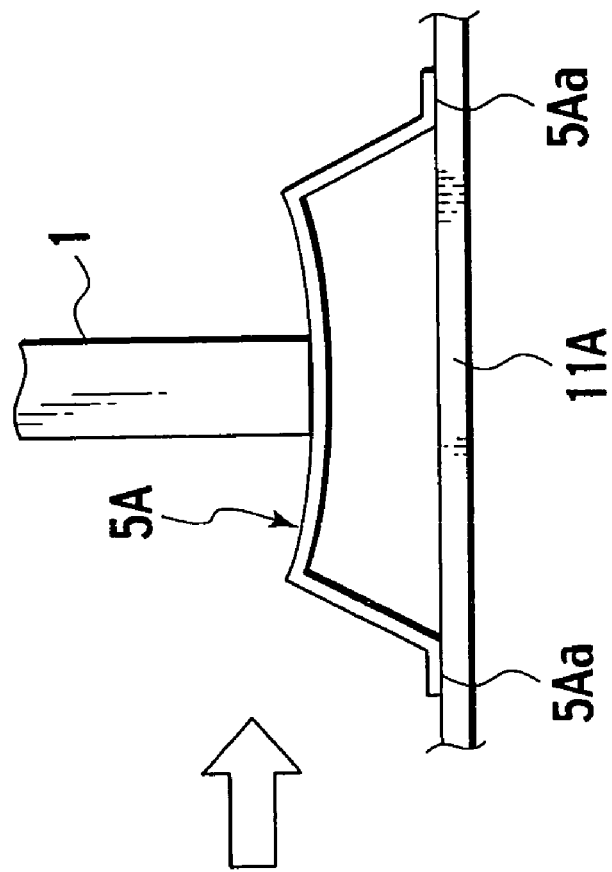
FIG. 6A is a view for illustrating a condition before a voltage-measuring terminal of the cell-voltage measuring unit is depressed against a unit cell of the fuel cell stack in the presently filed embodiment.

FIG. 5 is a perspective view of a voltage-measuring unit 9A of the presently filed embodiment as viewed from a side on which a voltage-measuring terminals 5A are located; FIG. 6A is a view illustrating a condition before the voltage-measuring terminal of the voltage-measuring unit is depressed against the unit cells of the fuel cell stack in the presently filed embodiment; and FIG. 6B is a view illustrating a condition after the voltage-measuring terminal of the voltage-measuring unit is depressed against the unit cells of the fuel cell stack in the presently filed embodiment.

As shown in FIG. 5, with the voltage-measuring unit 9A of the presently filed embodiment, each voltage-measuring terminal 5A is composed of a resilient member and takes the form of a structure wherein both ends 5Aa of the terminal 5A are bent and fixedly secured to a nonconductive plate 11A such that a central portion of the terminal 5A is slightly spaced from the plate 11A.

Figure 6B:
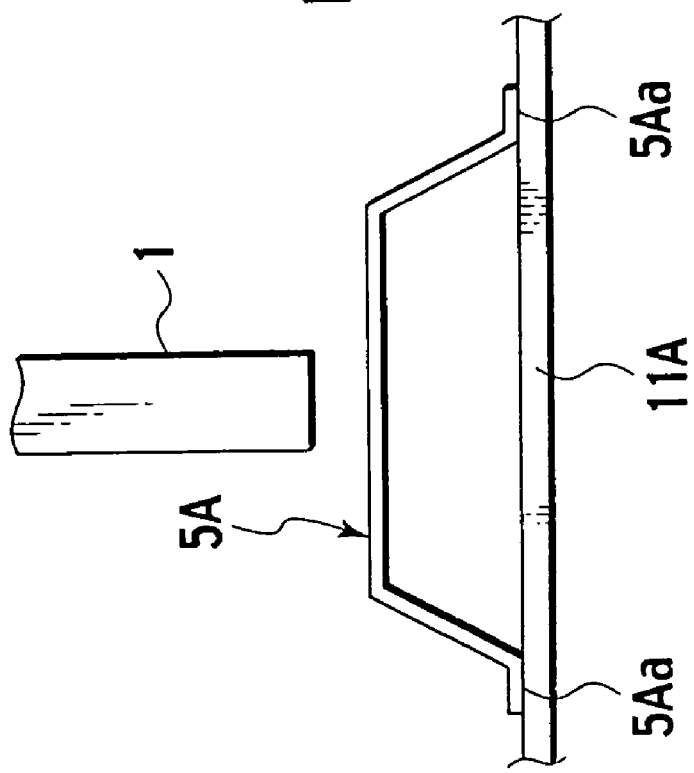
FIG. 6B is a view for illustrating a condition after the voltage-measuring terminal of the cell-voltage measuring unit is depressed against the unit cell of the fuel cell stack in the presently filed embodiment.

Thus, with the central portion of each voltage-measuring terminal 5A remained under such a spaced condition, contact surfaces of the voltage-measuring terminals 5A can be depressed to the voltage-measuring terminal contact sections 7 of the pairs of unit separators 1 until the contact surfaces of the voltage-measuring terminals 5A are resiliently deformed, respectively, as shown in FIGS. 6A and 6B.

By so doing, the pair of unit separators 1 and the voltage-measuring terminal 5A can be reliably brought into contact with one another and even if the location of the pair of unit separators 1 is deviated in position due to deformation caused by various component members resulting from variation in temperature built up during operations of the fuel cells, the cell voltages can be measured in a stable fashion.

Third Embodiment

Next, a cell-voltage measuring structure for a fuel cell stack and its related method of a third embodiment according to the present invention is described below in detail with reference to FIG. 7.

Figure 7:
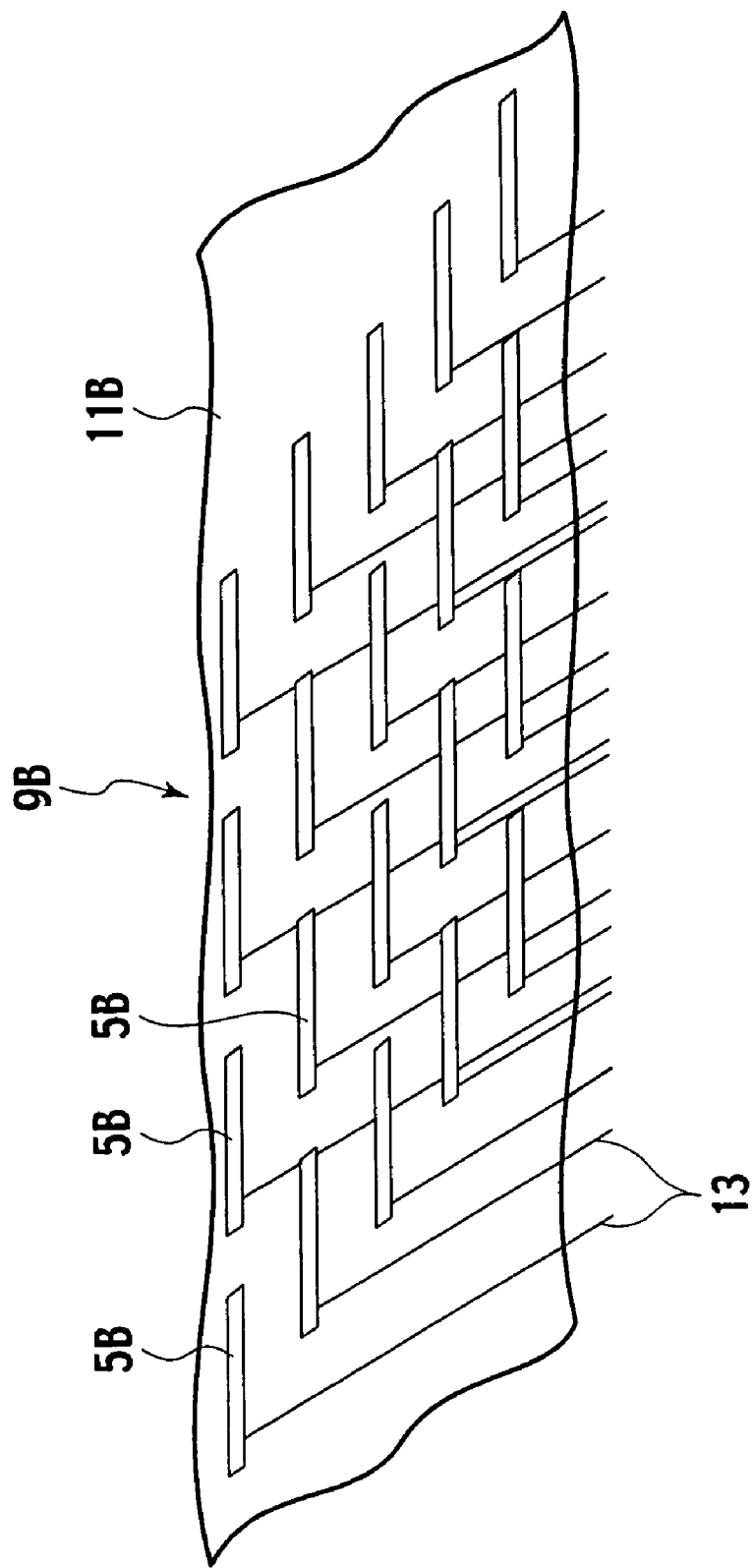
FIG. 7 is a perspective view of a cell-voltage measuring unit in a third embodiment according to the present invention.

FIG. 7 is a perspective view of a voltage-measuring unit 9B of the presently filed embodiment.

As shown in FIG. 7, a structure of the presently filed embodiment differs from that of the second embodiment in that each of voltage-measuring terminals 5B is made of extremely thin flat conductive member and the voltage-measuring terminal 5B is placed on a nonconductive plate 11B serving as a resilient plate with flexibility.

The voltage-measuring unit 9B, set forth above, is overlapped on the surface, formed with the cutouts 3, of the fuel cell stack S and typically held in close contact by means of conductive adhesive to be fixedly secured. Thus, even in the presence of convexo-concave portions or positional deviance in the voltage-measuring terminal contact section 7 of the pair of unit separators or the occurrence of deformation in the voltage-measuring terminal contact section 7 resulting from variation in temperature built up during operations of the fuel cells, the flexible nonconductive plate 11B adapts to such defects to avoid imperfect contact between the associated component parts, thereby enabling the measurement of the cell voltages in a stable manner.

Further, the whole of the voltage-measuring unit 9B is made of a merely thin flat plate, resulting in an increase in a space efficiency of the fuel cell system.

Fourth Embodiment

Next, a cell-voltage measuring structure for a fuel cell stack and its related method of a fourth embodiment according to the present invention is described below in detail with reference to FIG. 8.

Figure 8:
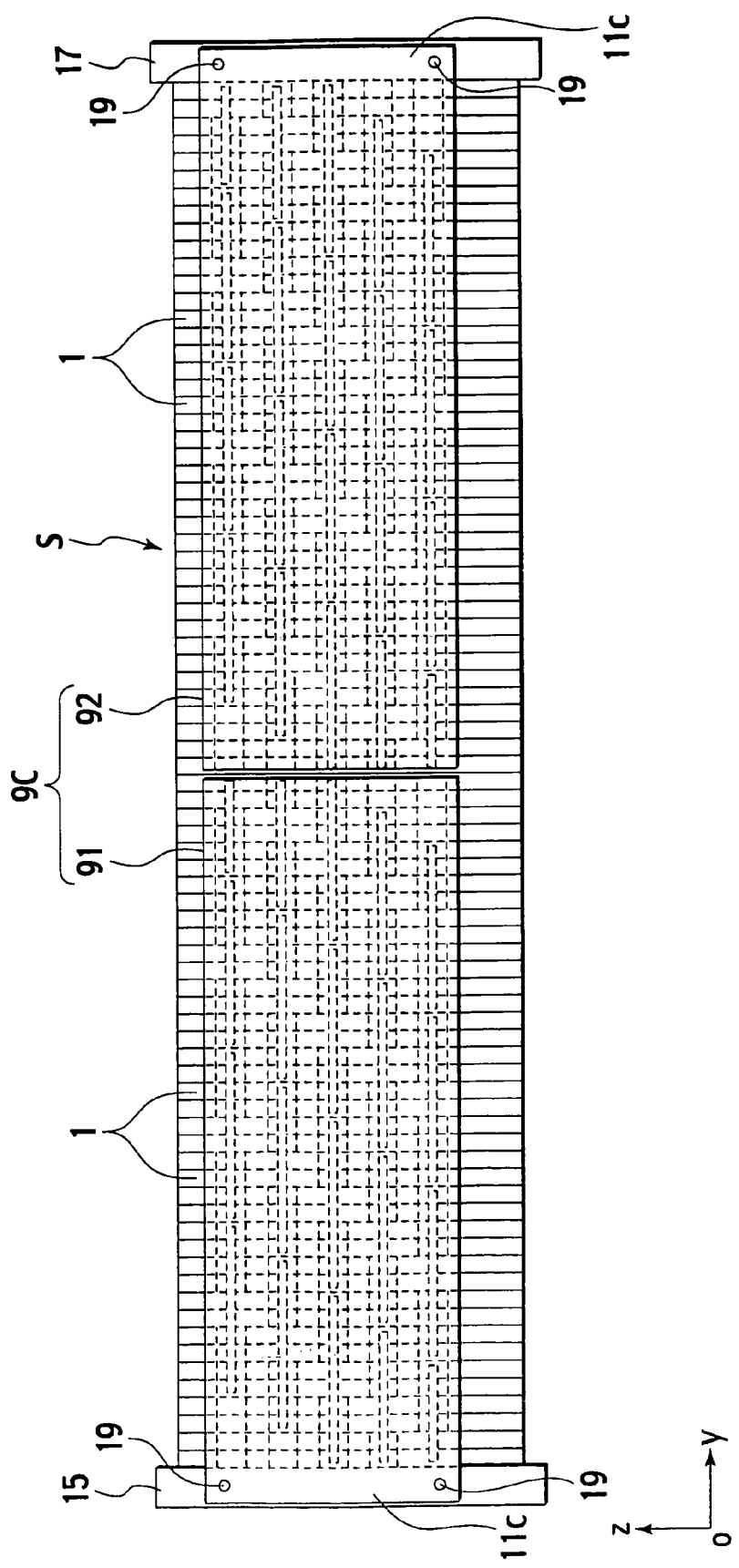
FIG. 8 is a front view illustrating a condition in which a cell-voltage measuring unit is mounted to a fuel cell stack in a fourth embodiment according to the present invention.

FIG. 8 is a front view illustrating a condition in which a voltage-measuring unit 9C is mounted to the fuel cell stack S in the presently filed embodiment.

The presently filed embodiment relates to a method of positioning the voltage-measuring unit 9C on the fuel cell stack S.

As shown in FIG. 8, with the presently filed embodiment, the voltage-measuring unit 9C includes two nonconductive plates 11C. Respective one ends of the plates 11C are overlapped on the end plates 15, 17, which are located on both ends of the stacked unit cells U, upon which locate pints 19 are inserted to the end plates 15, 17, respectively, from an upper area of the conductive plates 11C for fixing.

That is, the voltage-measuring unit 9C is divided at a central area in the stack direction into two sections including a measuring unit split body 91, which is positioned on one end plate 15, and a measuring unit split body 92 that is positioned on the other end plate 17.

With the presence of such a structure, for the respective measuring unit split bodies 91, 92, the numbers of the pairs of unit separators 1, which are juxtaposed from one pair of unit separators 1 nearest to corresponding one of the end plates 15, 17, whose positioning are relatively fixed, to the other remotest pair of unit separators 1 therefrom, decreases respectively by half in contrast to a case where no voltage-measuring unit is divided. Accordingly, the amount of deviance of the pairs of unit separators 1 in the stack direction with production tolerance in mind reduces by half in contrast to a case with no divided structure, thereby enabling reduction in the number of cutouts 3.

Under circumstances where in order to measure the cell voltages of the whole of the unit cells U in the fuel cell stack S, a unitary voltage-measuring unit with no divided structure is mounted to the fuel cell stack S, the voltage-measuring unit, which is positioned to the end plate 15 on one side, encounters an amplified amount of deviance as the measurement unit gets close to the opposite end plate 17 and, hence, there is a need for the number of cutouts 3 to be provided to the extent in which the resulting deviance can be absorbed. That is, as the number of unit cells increases, the number of cutouts 3 increases. As the number of cutouts 3 increases, it is undesirable that a difference in specification of the pairs of unit separators 1, that is, a difference in specification of the unit cells U increases with the resultant increase in man-hours for managing component parts or the resultant occurrence of cumbersome works in stacking operation.

Accordingly, as the structure of the presently filed embodiment, the voltage-measuring unit can be preferably divided to minimize the number of cutouts 3 as less as possible.

Fifth Embodiment

Next, a cell-voltage measuring structure for a fuel cell stack and its related method of a fifth embodiment according to the present invention is described below in detail with reference to FIGS. 9A and 9B.

Figure 9A:
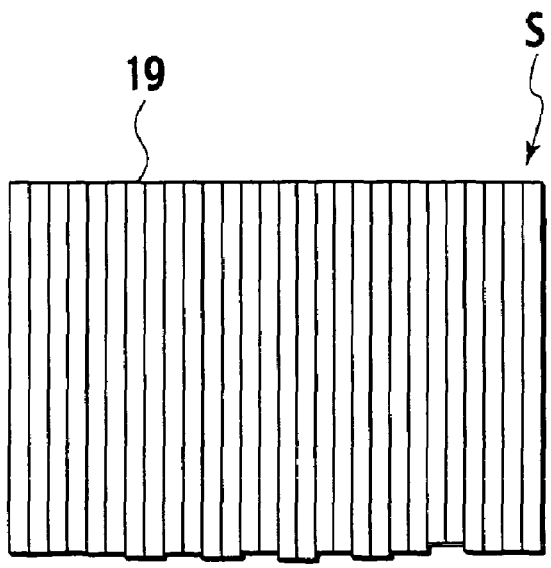
FIG. 9A is a side view illustrating a fuel cell stack, in which unit cells are stacked, of a fifth embodiment according to the present invention.
Figure 9B:
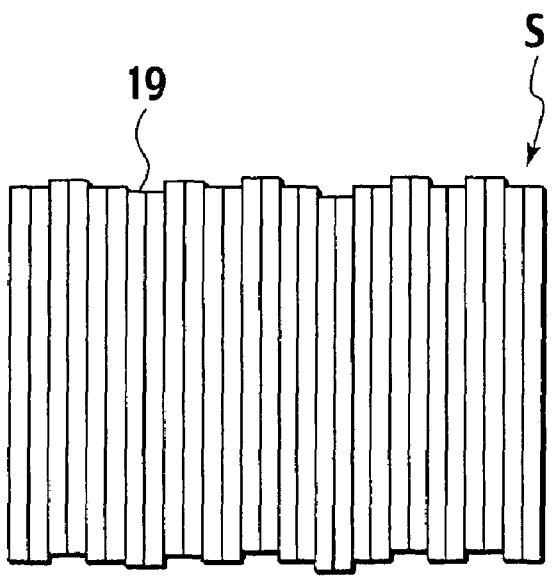
FIG. 9B is a side view showing a fuel cell stack of a comparative example in the presently filed embodiment.

FIG. 9A is a side view illustrating a fuel cell stack in which the unit cells of the presently filed unit cells are stacked and FIG. 9B is a side view illustrating a fuel cell stack of the presently filed embodiment as a comparative example.

With the presently filed embodiment, as shown in FIG. 9A, the pairs of unit separators 1, that is, the unit cells U are stacked based on one end face 19, formed with the cutouts 3 in the respective pairs of unit separators 1, of the fuel cell stack S as a reference planet and thus the end faces of the respective pairs of unit separators 1, that is, the unit cells U are aligned on the same plane in line with the one end face 19.

This equalizes a contact between the voltage-measuring terminals 5 and the respective pairs of unit separators 1 with respect to one another and imperfect contact between associated component parts can be avoided, enabling the measurement of the cell voltages of the respective unit cells U in a stable manner.

FIG. 9B shows an example wherein the pairs of unit separators 1, that is, the unit cells U are merely stacked without taking the one end face 19 formed with the cutouts 3 as the reference plane and in such a case, the end faces of the respective the pairs of unit separators 1, that is, the unit cells U are not aligned on the same plane with the resultant irregularities in the surfaces of the pairs of unit separators 1. That is, even if the voltage-measuring terminals are set in such non-aligned areas, probabilities occur with the occurrence of imperfect contacts.

Finally, a method of determining the number of cutouts to be formed on the pairs of unit separators 1 for the various embodiments set forth above is described below.

With the fuel cell stack S comprised of stacks of 150 pieces of the pairs of unit separators 1, for example, suppose that the pairs of unit separators 1 have a pitch (cell pitch) PH (see FIG. 2: a distance between the adjacent pairs of unit separators, substantially equivalent to a distance between the adjacent unit cells, in the stack direction) falling in a value of approximately 2.5 mm±0.05 mm. This precision is estimated and determined based on a process capability, in which separators are formed by molding, and a process capability at precision in thickness of GDL (Gas Diffusion Layer on an electrode surface) and that of a seal.

Here, the maximum value of the amount of positional deviance in the stack direction between one pair of unit separators 1 (first pair of unit separators) closest to one end plate and the other pair of unit separators 1 (150th pair of unit separators) is expressed as 0.05 mm×150 pieces=7.5 mm. Dividing 7.5 mm by the cell pitch of 2.5 mm gives 3 and, thus, the 150th pair of unit separators 1 encounters the deviance up to a value corresponding to three pairs of unit separators, that is, three unit cells in a plus or minus direction (left or right direction in FIG. 2) of the stack direction.

Accordingly, there is a probability in which the deviation occurs by six pairs of unit separators in total, that is, by three pairs of unit separators both in left and right directions and thus, six cutouts are needed for each pair of unit separators 1 and in other words, seven cutouts are needed for each unit cell U.

In such a way, the number of needed cutouts 3 can be calculated based on the number of stacked pairs of unit separators, the cell pitch and the pitch precision, thereby enabling the minimization in a difference in specifications of the pairs of unit separators without setting wasteful cutouts 3. In other words, since the number of stacked pairs of unit separators relate to that of stacked pieces of unit cells, the number of needed cutouts 3 can be also calculated based on the number of stacked pieces of unit cells, the cell pitch and the pitch precision.

Further, a required length of the voltage-measuring terminal involves the amount of maximum deviance falling in a value of 7.5 mm on both sides and may be determined by adding the pitch (width) of the own cell to that value in a manner as expressed as 17.5 mm=7.5 mm×2+2.5 mm.

Incidentally, with the various embodiments set forth above, the number of cutouts 3 may be preferably selected to fall in a value equal to or less than 7 typically for each unit cell U, provided that the cell pitch remains in the order of millimeters, when taking into consideration a substantial effective value in variation in precision of materials of the separators and seals, the practical number of pieces in stacks on mass production, and depending on such factors, the length of the voltage-measuring terminal may be preferably set to a value equal to or less than 20 mm.

Furthermore, while the various embodiments have been described above in conjunction with the structure wherein the pairs of unit separators 1 are formed with the plural cutouts 3 to provide the non-contact sections with the remaining flat areas serving as the contact sections, the relationship in height between the non-contact sections and the contact sections is, of course, relative and an alternative may be such that convex portions, with which a voltage-measuring terminal is brought into contact, are formed in different positions every for pairs of unit separators to allow the convex portions to be used for measuring cell voltages with similar effects. In such an alternative, since flat portions with no formation of the concave portions of the pairs of unit separators the non-contact sections with which no voltage-measuring terminal is brought into contact, the cutout portions may be omitted.

In addition, while the various embodiments have been described above in conjunction with the structure wherein the pairs of unit separators 1 are typically defined with the conductive anode separator A and the conductive cathode separator C, the pair of unit separators may be defined as a structure such that the conductive anode separator and the conductive cathode separator are adhered through a conductive plate with channels for coolant to be intervened therebetween.

As previously described above, with the structures of the various embodiments according to the present invention, it will be appreciated that the presence of non-contact sections, with which no voltage-measuring terminal is brought into contact, take the form of relative concave portions formed on one end portions of the outer peripheries of the conductive separators while permitting the contact sections, with which the voltage-measuring terminal is brought into contact, to take the form of relative concave portions formed on one end portions of the outer peripheries of the conductive separators whereby even in the presence of variations in position of the pairs of unit separators or the unit cells in the stack direction due to vibrations or production tolerances, the voltage-measuring terminal can be brought into contact with only given pair of unit separators.

More particularly, in other words, at least two pairs of unit separators having contact sections, formed in positions overlapping one another in the stack direction, respectively, with which the voltage-measuring terminal is brought into contact are located, and intermediate pairs of unit separators, located between the at least two pairs of unit separators, have non-contact sections, with which the voltage-measuring terminal is not held in contact, formed in positions that overlap the contact sections of the at least two pairs of unit separators in the stack direction. Also, depending on the number of such located intermediate pairs of unit separators, the intermediate pairs of unit separators are provided with the non-contact sections, respectively, and the contact sections, with which the voltage-measuring contact is brought into contact, of the intermediate pairs of unit separators are dislocated from one another so as not to overlap in the stack direction. Therefore, even in the presence of variation in position of the pairs of unit separators or the unit cells in the stack direction, the cell voltage can be measured in an effort provided with an ease of work for mounting the voltage-measuring terminal onto the fuel cell stack while permitting the voltage-measuring terminal to be brought into contact with only given pair of unit separators.

In compliance to such an arrangement, a length of the voltage-measuring terminal of the voltage-measuring unit in the stack direction is determined depending on the number of such located intermediate pairs of unit separators and the deviation in the pairs of unit separators or the unit cells in the stack direction can be reliably absorbed, enabling the voltage-measuring terminal to be reliably brought into contact with the given pair of unit separators.

Further, with the voltage-measuring terminals made of resilient member and the voltage measuring terminals placed on the nonconductive plate to form the voltage-measuring unit, when the voltage-measuring unit is pressed against one side face of the fuel cell stack, the voltage-measuring unit can be brought into contact with one end portion of the outer periphery of the separator under a condition where the voltage-measuring terminal is resiliently deformed and, so, loosened contact between the voltage-measuring terminal and the conductive separator can be prevented, resulting in improvement over a reliability in cell voltage measurement.

Further, with the voltage-measuring terminals placed on the nonconductive resilient plate to form the voltage-measuring unit, the voltage-measuring terminals can be bonded to the conductive separators of the associated pairs of unit separators with adhesive having conductivity, respectively, and the voltage measurement unit can be formed of a thin flat member, resulting in improvement in space efficiency of the fuel cell system.

Further, the voltage-measuring unit is divided into two measuring unit split bodies, in the stack direction of the unit cells, which are positioned and fixedly secured to both ends of the fuel cell stack in the stack direction thereof. Thus, for each measuring unit split body, the number of unit cells, such as those juxtaposed from one unit cell, closest to one end of the fuel cell stack to which positioning is made, to the other unit cell remotest from the associated one unit cell in the stack direction, decreases by half in contrast to a case where no voltage-measuring unit is divided. Therefore, the amount of deviation of the unit cells in the stack direction with production tolerance in mind decreases by half in contrast to a case with no divided structure, enabling reduction in the number of non-contact sections in the pairs of unit separators with which the voltage-measuring terminals are not held in contact. This results in reduction (reduction in the number of separators in different shapes) in a difference in specification of the unit cells with the resultant reduction in manufacturing costs.

Furthermore, since the conductive separator is formed in a rectangular shape and the respective pairs of unit separators or the unit cells are stacked to one another under a condition where the end faces of the pairs of unit separators or the unit cells on one side, with which the voltage-measuring terminal is brought into contact, are aligned with one another the contact between the voltage-measuring terminal and the pairs of unit separators or the unit cell is equalized for thereby preventing the occurrence of imperfect contact, enabling the measurement of the cell voltage of each unit cell.

Moreover, since the number of non-contact sections of each pair of unit separators with which the voltage-measuring terminal is not brought into contact can be determined based on a value obtained by multiplying a dimensional tolerance of the cell pitch by the number of stacks of the unit cells and dividing the resultant by the cell pitch, it is possible to determine an optimum separator specification upon consideration of variation in the cell pitches in the stack direction, enabling reduction in costs by minimizing the number of separators different in shapes (specifications).

Also, with the number of non-contact sections, not to be contact with the respective voltage-measuring terminals, of the unit cells being selected to be equal to or less than seven pieces for each unit cell, the fuel cell stack is able to adapt to a substantially effective value in variation of material precisions, such as those of the separators and the seals, the number of pieces of the realistic unit cells on mass production and a thickness of the separators.

In summary of the foregoing, according to the present invention, when measuring the cell voltages of the respective unit cells, the voltage-measuring unit is sufficed to be mounted onto the fuel cell stack on one side thereof under a pressed condition, enabling the measurement of the cell voltages with an ease in work for mounting the voltage-measuring terminals to the fuel cell stack. Additionally, the pair of unit separators of the unit cells adjacent to the pair of unit separators, with which the voltage-measuring terminal is brought into contact, are formed with the non-contact section with which no voltage-measuring terminal is brought into contact. Thus, even in the presence of variation in position of the pairs of unit separators or the unit cells in the stack direction, the voltage-measuring terminal can be reliably brought into contact with the given pair of unit separators.

The entire content of a Patent Application No. TOKUGAN 2004-085233 with a filing date of Mar. 23, 2004 in Japan and that of a Patent Application No. TOKUGAN 2005-046003 with a filing date of Feb. 22, 2005 in Japan are hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A cell-voltage measuring structure for a fuel cell stack in which a plurality of unit cells, having conductive separators, are stacked in a stack direction, the conductive separators including anode-side separators and cathode-side separators to form pairs of unit separators with the anode-side separators and the cathode-side separators adjacent to each other, respectively, the structure comprising:
   a voltage-measuring unit having a conductive voltage-measuring terminal;
   a contact section, with which the conductive voltage-measuring terminal is to be held in face to face contact, formed on a side face, which is defined by the stack direction and a direction perpendicular to the stack direction, of a first pair of unit separators; and
   a non-contact section, with which the conductive voltage-measuring terminal is to not be held in contact, concavely formed on a side face, which is defined by the stack direction and a direction perpendicular to the stack direction, of a second pair of unit separators adjacent to the first pair of unit separators, a length of the conductive voltage-measuring terminal in the stack direction being greater than a thickness of the first pair of unit separators in the stack direction, and the conductive voltage-measuring terminal extending in the stack direction to contact the contact section without contacting the non-contact section which is adjacent to the contact section.

2. The cell-voltage measuring structure according to claim 1, wherein the voltage-measuring unit is to be brought into abutting contact with a surface of the fuel cell stack on one side thereof on which the contact section and non-contact section are formed.

3. The cell-voltage measuring structure according to claim 1, wherein the non-contact section includes a relative concave portion formed on the side face of the second pair of unit separators.

4. The cell-voltage measuring structure according to claim 1, wherein the contact section includes a relative convex portion formed on the side face of the first pair of unit separators.

5. The cell-voltage measuring structure according to claim 1, wherein the fuel cell stack includes a third pair of unit separators formed with the contact section in position to overlap, in the stack direction, with that of the first pair of unit separators, and further includes an intermediate pair of unit separators, disposed between the first pair of unit separators and the third pair of unit separators, which are formed with the non-contact section in position to overlap, in the stack direction, with the contact section of the first pair of unit separators and that of the third pair of unit separators.

6. The cell-voltage measuring structure according to claim 5, wherein depending on the number of the intermediate pair of unit separators, the non-contact section is disposed on the intermediate pair of unit separators, respectively.

7. The cell-voltage measuring structure according to claim 5, wherein a length of the conductive voltage-measuring terminal in the stack direction is determined depending on the number of the intermediate pair of unit separators.

8. The cell-voltage measuring structure according to claim 1, wherein a contact section of one pair of unit separators is dislocated from that of the other pair of unit separators, adjacent thereto, so as to not overlap with one another in the stack direction.

9. The cell-voltage measuring structure according to claim 1, wherein the voltage-measuring unit includes the conductive voltage-measuring terminal, which is made of resilient material, and a nonconductive plate and operative such that when the voltage-measuring unit is brought into abutting contact with a surface of the fuel cell stack on one side thereof on which the contact section and the non-contact section are formed, the conductive voltage-measuring terminal is brought into abutting contact with the contact section under a resiliently deformed condition.

10. The cell voltage measuring structure according to claim 1, wherein the voltage-measuring unit includes a nonconductive resilient plate, on which the conductive voltage-measuring terminal is placed, and the conductive voltage-measuring terminal is bonded to the contact section.

11. The cell-voltage measuring structure according to claim 1, wherein the voltage-measuring unit includes a set of measuring unit split bodies, which are divided into two pieces in the stack direction, one of which is positioned at and fixedly secured to one end of the fuel cell stack in the stack direction and the other end of which is positioned at and fixedly secured to the other end of the fuel cell stack in the stack direction.

12. The cell-voltage measuring structure according to claim 1, wherein the plurality of unit cells are stacked in a way wherein ends of the plurality of unit cells are held in contact with the conductive voltage-measuring terminal and are aligned with respect to one another.

13. The cell-voltage measuring structure according to claim 1, wherein a number of non-contact sections of each pair of unit separators is determined based on a value obtained by multiplying a dimensional tolerance of a cell pitch in the stack direction by a number of stacks of the plurality of unit cells and dividing the resultant value by the cell pitch.

14. The cell-voltage measuring structure according to claim 1, wherein a number of non-contact sections in each of the plurality of unit cells is equal to or less than 7 pieces.

15. A cell-voltage measuring structure for a fuel cell stack in which a plurality of unit cells, having conductive separators, are stacked in a stack direction, the conductive separators including anode-side separators and cathode-side separators to form pairs of unit separators with the anode-side separators and the cathode-side separators adjacent to each other, the structure comprising:
a voltage-measuring unit having a conductive voltage-measuring terminal;
first means for face to face contacting the conductive voltage-measuring terminal, the first means being formed on a side face, which is defined by the stack direction and a direction perpendicular to the stack direction, of a first pair of unit separators; and
second means for avoiding contact with the conductive voltage-measuring terminal, the second means being concavely formed on a side face, which is defined by the stack direction and a direction perpendicular to the stack direction, of a second pair of unit separators adjacent to the first pair of unit separators, a length of the conductive voltage-measuring terminal in the stack direction being greater than a thickness of the first pair of unit separators in the stack direction, and the conductive voltage-measuring terminal extending in the stack direction to contact the first means without contacting the second means which is adjacent to the first means.

16. A cell-voltage measuring method of measuring a cell-voltage of a fuel cell stack in which a plurality of unit cells, having conductive separators, are stacked in a stack direction, the conductive separators including anode-side separators and cathode-side separators to form pairs of unit separators with the anode-side separators and the cathode-side separators adjacent to each other, comprising:
providing a voltage-measuring unit having a first conductive voltage-measuring terminal and a second conductive voltage-measuring terminal;
providing a fuel cell stack including a first pair of unit separators and a second pair of unit separators, a first contact section being formed on a side face, which is defined by the stack direction and a direction perpendicular to the stack direction, of the first pair of unit separators to be held in contact with the first conductive voltage-measuring terminal, a first non-contact section being concavely formed on the side face of the first pair of unit separators to not be held in contact with the second conductive voltage-measuring terminal, a second contact section being formed on a side face, which is defined by the stack direction and a direction perpendicular to the stack direction, of the second pair of unit separators to be held in face to face contact with the second conductive voltage-measuring terminal, a second non-contact section being concavely formed on the side face of the second pair of unit separators to not be held in contact with the first conductive voltage-measuring terminal, a length of the first conductive voltage-measuring terminal in the stack direction being greater than a thickness of the first pair of unit separators in the stack direction and the first conductive voltage-measuring extending in the stack direction to contact the first contact section without contacting the first non-contact section which is adjacent to the first contact section, and a length of the second conductive voltage-measuring terminal in the stack direction being greater than a thickness of the second pair of unit separators in the stack direction and the second conductive voltage-measuring terminal extending in the stack direction to contact the second contact section without contacting the second non-contact section which is adjacent to the second contact section; and measuring a cell-voltage of the fuel cell stack while causing the first contact section to contact the first conductive voltage-measuring terminal and the second contact section to contact the second conductive voltage-measuring terminal.

* * * * *